(12) United States Patent
Wong et al.

(10) Patent No.: US 6,879,749 B2
(45) Date of Patent: Apr. 12, 2005

(54) SYSTEM AND METHOD FOR MULTIPLEXING AND DEMULTIPLEXING OPTICAL SIGNALS USING DIFFRACTION GRATINGS

(75) Inventors: Seng-leong Wong, Richardson, TX (US); Leo Yu-Yu Lin, Richardson, TX (US); YanQing Lu, Dallas, TX (US)

(73) Assignee: EC-Optics Technology Inc., Taipei (TW)

( * ) Notice: Subject to any disclaimer, the term of this patent is extended or adjusted under 35 U.S.C. 154(b) by 216 days.

(21) Appl. No.: 10/294,971

(22) Filed: Nov. 14, 2002

(65) Prior Publication Data

US 2003/0099433 A1 May 29, 2003

Related U.S. Application Data

(60) Provisional application No. 60/334,371, filed on Nov. 27, 2001.

(51) Int. Cl.$^7$ .......................... G02B 6/293; G02B 6/32; G02B 6/34
(52) U.S. Cl. .............................. 385/24; 385/33; 385/37
(58) Field of Search .............................. 385/15, 24, 31, 385/33, 35, 36, 37, 39, 1, 11, 43; 349/193, 194

(56) References Cited

U.S. PATENT DOCUMENTS

| | | | |
|---|---|---|---|
| 4,741,588 A | 5/1988 | Nicia et al. | 350/96.19 |
| 4,926,412 A | 5/1990 | Jannson et al. | 370/3 |
| 5,107,359 A | 4/1992 | Ohuchida | 359/124 |
| 5,136,671 A | 8/1992 | Dragone | 385/46 |
| 5,414,540 A | 5/1995 | Patel et al. | 359/39 |
| 5,841,500 A | 11/1998 | Patel | 349/141 |
| 5,886,785 A | 3/1999 | Lefevre et al. | 356/328 |
| 5,960,133 A | 9/1999 | Tomlinson | 385/18 |
| 5,999,672 A | 12/1999 | Hunter et al. | 385/37 |
| 6,011,884 A | 1/2000 | Dueck et al. | 385/24 |
| 6,075,512 A | 6/2000 | Patel et al. | 345/101 |
| 6,084,695 A | 7/2000 | Martin et al. | 359/131 |
| 6,108,471 A | 8/2000 | Zhang et al. | 385/37 |
| 6,137,933 A | 10/2000 | Hunter et al. | 385/37 |
| 6,169,838 B1 | 1/2001 | He et al. | 385/129 |
| 6,239,891 B1 | 5/2001 | Nakama | 359/131 |
| 6,249,364 B1 | 6/2001 | Martin et al. | 359/130 |
| 6,263,134 B1 | 7/2001 | Laude | 385/37 |
| 6,621,958 B1 * | 9/2003 | Dueck et al. | 385/37 |

FOREIGN PATENT DOCUMENTS

EP   0 859 249 A1   2/1998   ........... G02B/6/293

OTHER PUBLICATIONS

PCT Report for PCT/US02/37941, 6 pp, Feb. 26, 2003.
Senior et al.., "Devices for wavelength multiplexing and demultiplexing," IEEE Proceedings, vol. 136, Pt. J., No. 3, pp. 183–202, Jun. 1989.

* cited by examiner

*Primary Examiner*—John D. Lee
(74) *Attorney, Agent, or Firm*—Baker Botts L.L.P.

(57) ABSTRACT

An optical device for demultiplexing an optical signal comprises a grating that receives an optical signal comprising a plurality of wavelength channels, and generates a plurality of spatially separated light beams. Each light beam is associated with a particular wavelength channel. The optical device further comprises an optical element that at least partially compensates a temperature based frequency shift associated with the spatially separated light beams. The optical device further comprises a plurality of lenses and a plurality of fibers. The plurality of lenses are arranged such that a spacing between at least a pair of lenses is determined to at least partially compensate a non-linearity introduced by the grating. Each fiber is associated with a corresponding lens and receives a corresponding light beam. At least one fiber is placed a distance that is less than a focal length associated with its corresponding lens.

61 Claims, 4 Drawing Sheets

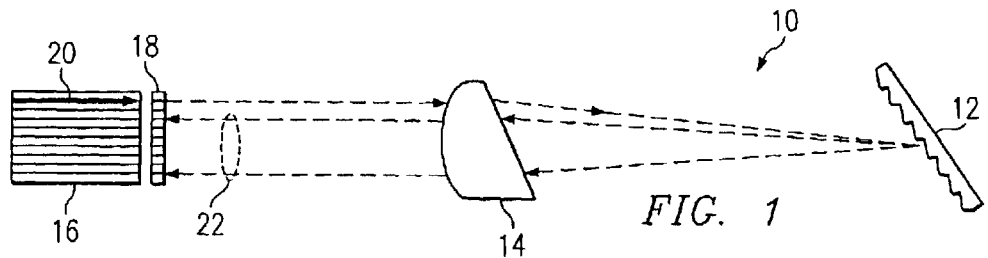
FIG. 1
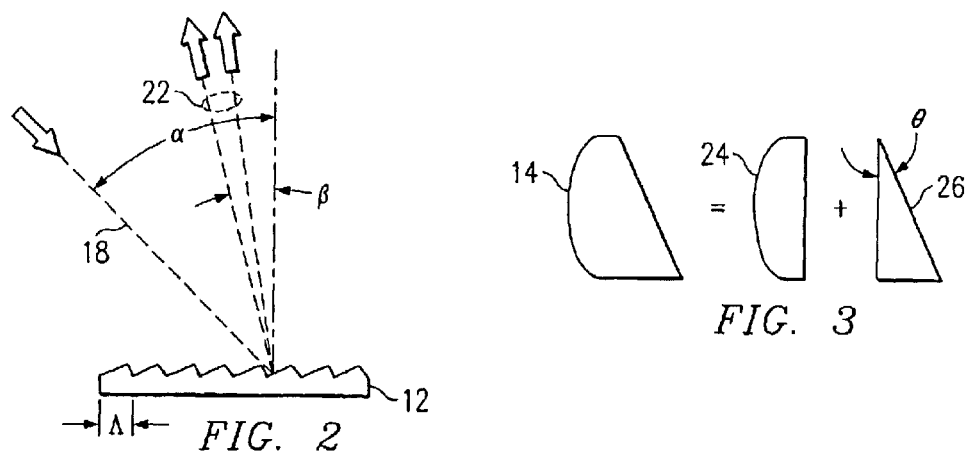
FIG. 2
FIG. 3
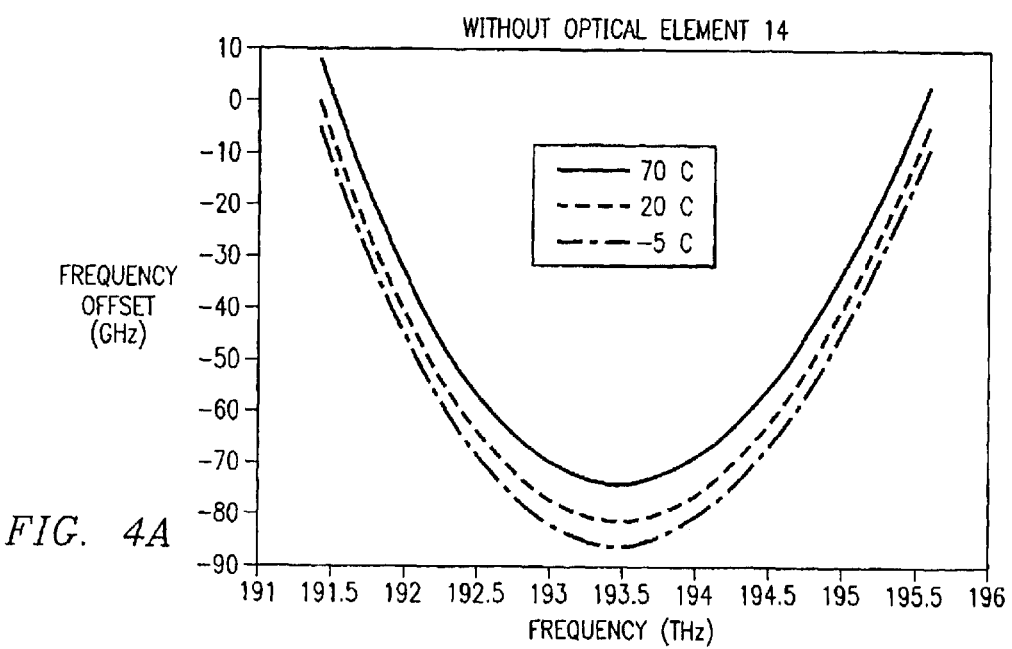
FIG. 4A

SYSTEM AND METHOD FOR MULTIPLEXING AND DEMULTIPLEXING OPTICAL SIGNALS USING DIFFRACTION GRATINGS

CROSS REFERENCE TO RELATED APPLICATION

This application is related to and claims the benefit of U.S. Provisional Application No. 60/334,371 filed Nov. 27, 2001.

TECHNICAL FIELD OF THE INVENTION

The present invention relates generally to the field of optical communications systems. More specifically, the present invention relates to a system for multiplexing and demultiplexing optical signals using diffraction gratings.

BACKGROUND OF THE INVENTION

Bulk diffraction grating (BDG) based multiplexer/demultiplexer (Mux/Demux) devices have recently found application in dense wavelength division multiplexing (DWDM) optical communication systems. Compared to other techniques for processing DWDM optical signals (e.g., fiber Bragg grating, arrayed waveguide grating, thin film filters), BDG provides an economical way for high channel count DWDM solutions. However, a drawback that limits the application of BDG devices is its Gaussian-shape spectral response. As a result, any drift or offset of a frequency from its specified value (e.g., an ITU frequency) may result in significant loss of that frequency. Although the laser source can be controlled and the frequency stabilized to prevent frequency hopping, there is typically some frequency drift that will occur. In addition, a BDG device also could have its actual channel centers deviate from their designed frequency due to mechanical movement or temperature fluctuation.

SUMMARY OF THE INVENTION

In accordance with the present invention, the disadvantages and problems associated with optical communication systems have been substantially reduced or eliminated.

In one embodiment, an optical device for demultiplexing an optical signal comprises a grating that receives an optical signal comprising a plurality of wavelength channels, and generates a plurality of spatially separated light beams. Each light beam is associated with a particular wavelength channel. The optical device further comprises an optical element that at least partially compensates a temperature based frequency shift associated with the spatially separated light beams. The optical device further comprises a plurality of lenses and a plurality of fibers. The plurality of lenses are arranged such that a spacing between at least a pair of lenses is determined to at least partially compensate a non-linearity introduced by the grating. Each fiber is associated with a corresponding lens and receives a corresponding light beam. At least one fiber is placed a distance that is less than a focal length associated with its corresponding lens.

In another embodiment, an optical device for multiplexing a plurality of wavelength channels comprises a grating that receives a plurality of spatially separated light beams, each light beam associated with a particular wavelength channel, and generates an optical signal comprising the plurality of light beams. The optical device further comprises an optical element that at least partially compensates a temperature based frequency shift associated with the spatially separated light beams. The optical device further comprises a plurality of lenses and a plurality of fibers. The plurality of lenses are arranged such that a spacing between at least a pair of lenses is determined to at least partially compensate a non-linearity introduced by the grating. Each fiber is associated with a corresponding lens and communicates a corresponding light beam. At least one fiber is placed a distance that is less than a focal length associated with its corresponding lens.

The following technical advantages may be achieved by some, none, or all of the embodiments of the present invention. The optical device multiplexes and/or demultiplexes an optical signal and compensates for temperature fluctuations and/or non-linear dispersion that may be introduced by the multiplexing and/or demultiplexing processes. Particular embodiments of the optical device include a lens array that improves connectivity, system stability and transmission bandwidth. In this regard, the insertion loss of the optical device is reduced.

These and other advantages, features, and objects of the present invention will be more readily understood in view of the following detailed description and the drawings.

BRIEF DESCRIPTION OF THE DRAWINGS

For a more complete understanding of the present invention and its advantages, reference is now made to the following description, taken in conjunction with the accompanying drawings, in which:

FIG. 1 illustrates an optical device in accordance with one embodiment of the present invention;

FIG. 2 illustrates one embodiment of a diffraction grating used by the optical device of FIG. 1;

FIG. 3 illustrates one embodiment of a refractive optical element used by the optical device of FIG. 1;

FIGS. 4A and 4B illustrate the effect of the refractive optical element on the thermal stability of the optical device of FIG. 1;

DETAILED DESCRIPTION OF THE INVENTION

Figure 4B:
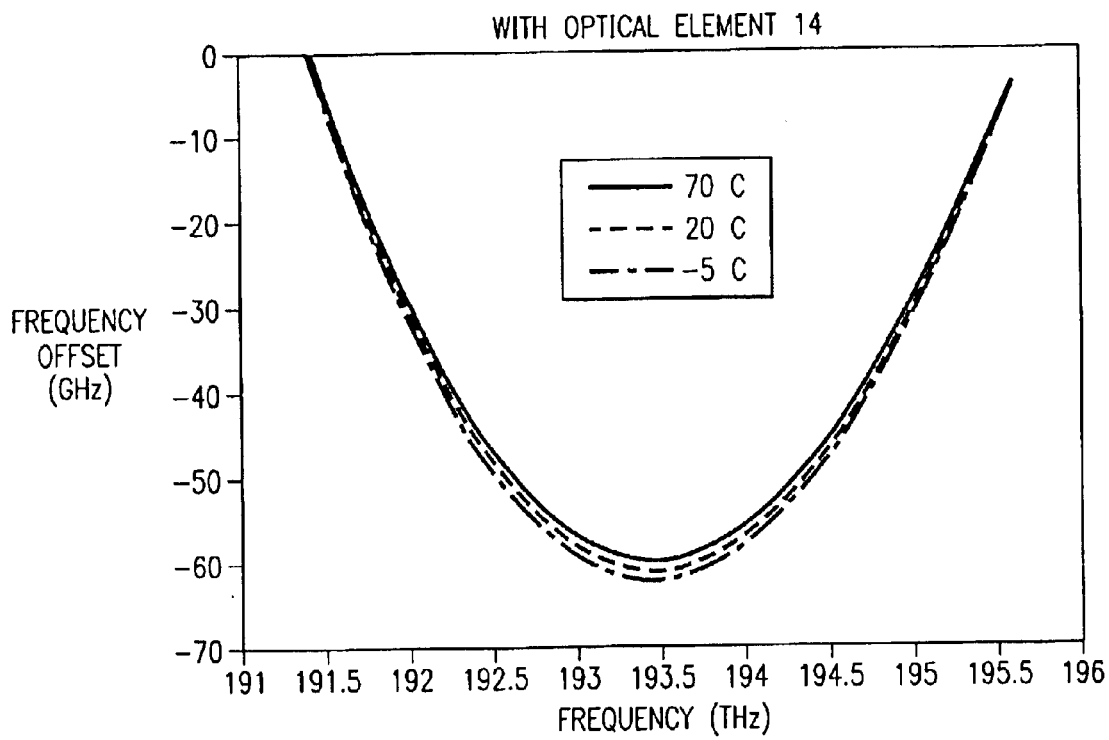

FIG. 1 illustrates one embodiment of an optical device 10 that includes a diffraction grating 12, a refractive optical element 14, and a fiber array 16. In some embodiments, device 10 further comprises a lens array 18. In general, device 10 performs a multiplexing function and/or a demultiplexing function upon an optical signal. When performing the multiplexing function, device 10 combines a plurality of spatially separated light beams, each light beam comprising a separate wavelength channel, into a single, more densely spaced wavelength division multiplexed (WDM) optical signal. The multiplexing function of device 10 is described in greater detail below. When performing the demultiplexing function, device 10 separates a WDM optical signal, such as optical signal 20, into a plurality of spatially separated light beams 22, each light beam comprising a separate wavelength channel. Device 10 compensates for temperature fluctuations and non-linear dispersion that may be introduced by the multiplexing and/or demultiplexing processes.

Diffraction grating 12 comprises an optical element having a multiple slit arrangement which uses diffraction to separate a WDM optical signal into spatially separated light beams 22, each light beam 22 comprising a wavelength channel, during a demultiplexing operation. During a multiplexing operation, grating 12 combines spatially separated light beams 22, each light beam 22 comprising a wavelength channel, into a WDM optical signal. In general, diffraction grating 12 comprises a reflection grating such that each incident light beam is reflected by grating 12. Diffraction grating 12 is described in greater detail with respect to FIG. 2.

Refractive optical element 14 comprises a combination of a lens and a prism, as described in greater detail with respect to FIG. 3. Although FIGS. 1 and 3 illustrate element 14 as a prism and a lens arranged as an integrated structure, it should be understood that element 14 may also comprise a lens and a prism spaced apart from one another. The embodiment of element 14 arranged as a prism and a lens in an integrated structure provides the advantage of compactness of size as well as alignment stability. This leads to ease in the manufacturing process. Moreover, the insertion loss may be smaller than a spaced apart lens and prism configuration.

Fiber array 16 comprises an appropriate arrangement of optical fibers or any other suitable optical waveguides used to communicate optical signal 20 and/or to receive optical signals 22. The fibers and/or waveguides of fiber array 16 may be referred to as fiber 16 and/or waveguides 16. The optical fibers 16 of fiber array 16 comprise a glass core designed to transmit information in the form of light pulses, and a glass cladding that surrounds the glass core to prevent light from escaping the core during transmission. These fibers may comprise a multi-mode fiber having a large core (e.g., 62 microns wide) or a single-mode fiber having a small core (e.g., 9 microns wide). As described with reference to FIG. 11, the core of a particular fiber 16 may be tapered, or otherwise manipulated in shape and/or size to provide improved connectivity and/or to reduce insertion loss.

Lens array 18 comprises a plurality of lenses comprising glass or any other suitable optically transmissive material. Each lens of lens array 18 may also be referred to as lens 18. Each lens 18 may comprise a convex lens or a planar lens having a gradient index (GRIN) of refraction. The spacing between each lens 18 of the lens array 18 generally corresponds to the spacing between particular fibers 16 of fiber array 16. By using lens array 18, the collectible area of light for each corresponding fiber 16 is effectively increased thereby improving connectivity, system stability, and transmission bandwidth. In this regard, the insertion loss of device 10 is reduced.

In operation of device 10 performing a demultiplexing function, a particular fiber 16 of fiber array 16 communicates a WDM optical signal 20. Optical signal 20 comprises a plurality of wavelength channels to be demultiplexed by device 10. Element 14 collimates optical signal 20 such that it propagates toward diffraction grating 12 at a particular incident angle. When optical signal 20 strikes diffraction grating 12, the different wavelength channels are diffracted at different angles according to a grating relationship, as described in greater detail with reference to FIG. 2. Therefore, diffraction grating 12 generates a plurality of spatially separated light beams 22 from optical signal 20, each light beam 22 associated with a particular wavelength channel.

Element 14 decollimates each spatially separated light beam 22 such that each beam 22 converges upon a corresponding lens 18 of lens array 18. Each lens 18 communicates a corresponding light beam 22 to a corresponding fiber 16 of fiber array 16. As described above, each lens 18 effectively increases the collectible area of light for each corresponding fiber 16. This helps reduce insertion loss in device 10.

In operation of device 10 performing a multiplexing function, the fibers 16 of fiber array 16 communicate a plurality of spatially separated light beams 22. Each light beam 22 comprises a different wavelength channel. Element 14 collimates each light beam 22 such that they propagate toward diffraction grating 12. Diffraction grating 12 combines the spatially separated light beams 22 into WDM optical signal 20. Element 14 decollimates signal 20 such that it converges upon a corresponding lens 18 of lens array 18. The lens 18 communicates signal 20 to a corresponding fiber 16 of fiber array 16.

In certain embodiments, temperature fluctuations may cause a shift in the center frequency of one or more spatially separated light beams 22. In one embodiment, element 14 processes the wavelength channels of the spatially separated light beams 22 such that the shift in center frequency of any given wavelength channel is substantially the same over a range of temperatures. Furthermore, in a particular embodiment, fiber array 16 and lens array 18 are arranged with particular spacings in order to compensate for any shifts in the center frequency of the spatially separated light beams 22. These techniques may be used in either or both of the multiplexing and demultiplexing modes of operation.

FIG. 2 illustrates one embodiment of diffraction grating 12. The relationship between the incidence angle, $\alpha$, and the diffraction angles, $\beta$, for each wavelength channel is given by the following grating equation:

$$n_{air} \cdot \Lambda(\sin \alpha + \sin \beta) = m\lambda$$

where:

$\alpha$=incidence angle;

$\beta$=diffraction angle;

$\Lambda$=grating period;

$\lambda$=wavelength of lightbeam;

$n_{air}$=refractive index of air; and m=diffraction order

From the grating equation, it can be seen that the diffraction angle, $\beta$, changes with the wavelength of the light beam, $\lambda$, and the refractive index of air, $n_{air}$. The angular dispersion is provided by the following equation:

$$\frac{d\beta}{df} = \frac{-c}{f^2} \cdot \frac{m}{n_{air} \cdot \Lambda \cos\beta}$$

where:
β=diffraction angle;
Λ=grating period;
$n_{air}$=refractive index of air;
m=diffraction order;
f=frequency of light beam; and
c=speed of light.

Because the angular dispersion depends on the frequency of the light beam, f, the angular dispersion of the spatially separated light beams 22 is generally not linear.

FIG. 3 illustrates one embodiment of refractive optical element 14 that comprises a combination of lens 24 and prism 26. In general, lens 24 comprises a convex surface and a substantially flat surface. Prism 26 is designed with a vertex angle, θ. In general, lens 24 and prism 26 may comprise any suitable refractive material, such as fused silica. It should be understood, however, that lens 24 and prism 26 may comprise the same or different materials whether they are used as separate elements or as an integrated structure. When working with a particular diffraction grating 12, the vertex angle of prism 26 may be selected and/or adjusted until the overall thermal variation of dispersion is substantially reduced. In this regard, the center frequency of device 10 is made to be stable at different environmental temperatures. The combination of lens 24 and prism 26 in an integrated structure yields refractive element 14 that provides the advantage of compactness of size as well as alignment stability. However, element 14 may be made with lens 24 and prism 26 spaced apart from one another.

FIGS. 4A and 4B illustrate the effect of refractive optical element 14 on the thermal stability of device 10. In particular, FIGS. 4A and 4B illustrate the frequency offset (GHz) versus the frequency (THz) for signals at a range of temperatures. Referring to FIG. 4A, the temperature fluctuation induced center frequency shift of an exemplary wavelength channel (e.g., 193.5 THz center frequency) is illustrated over a range of temperatures (e.g., −5° Celsius, 20° Celsius, 70° Celsius). It can be seen that the wavelength channel depicted in FIG. 4A has a first center frequency offset at a first operating temperature (e.g., −5° Celsius), a second frequency offset at a second operating temperature (e.g., 20° Celsius), and a third frequency offset at a third operating temperature (e.g., 70° Celsius). The variation in center frequency offsets over a range of temperatures makes it difficult to compensate for the impact of temperature fluctuations upon any given wavelength channel.

Refractive optical element 14 processes the wavelength channel such that the difference between the first center frequency offset, the second center frequency offset, and the third center frequency offset is less than a predetermined threshold at each of the first operating temperature, the second operating temperature, and the third operating temperature, as illustrated in FIG. 4B. By substantially reducing the difference in center frequency offset for the wavelength channel at various operating temperatures, the overall center frequency offset for the wavelength channel may be addressed over a range of temperatures, as described below with reference to FIGS. 5–7.

Figure 5:
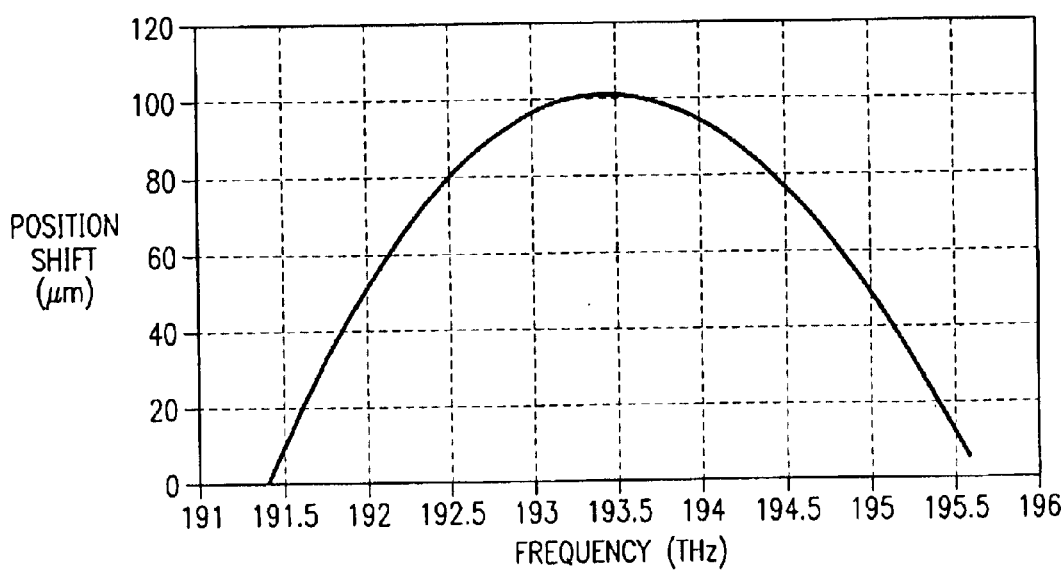
FIG. 5 illustrates the effect of non-linear dispersion caused by the diffraction grating of FIG. 2.

FIG. 5 illustrates the effect of non-linear dispersion caused by diffraction grating 12. As described above with regard to FIG. 2, the angular dispersion of grating 12 depends on the frequency of each light beam 22 and is therefore generally non-linear. These non-linearites associated with angular dispersion result in a position shift of the center frequency of various wavelength channels. For any given center frequency of a wavelength channel, the position shift of the light beam 22 is illustrated. For example, the position shift of a wavelength channel having a center frequency of 191.6 THz is approximately twenty microns. The position shift of a wavelength channel having a center frequency of 193.2 THz is approximately one-hundred microns. The position shift of a wavelength channel having a center frequency of 195.4 THz is approximately 20 microns.

Figure 6:
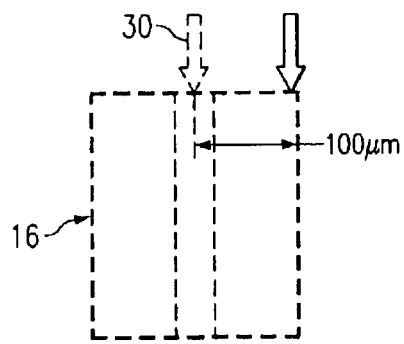
FIG. 6 illustrates one embodiment of a position shift that is induced by the non-linear dispersion illustrated in FIG. 5.

FIG. 6 illustrates the effect of the non-linear dispersion induced position shift illustrated in FIG. 5. In particular, FIG. 6 illustrates a fiber 16 receiving a light beam 22 having a center frequency of 193.2 THz. Ideally, the core of fiber 16 receives the center frequency of the light beam 22 with no position shift, as illustrated by arrow 30. However, the center frequency of the light beam 22 is actually received by fiber 16 away from the fiber core due to the position shift caused non-linear dispersion, as described with regard to FIG. 5. The position shift for this light beam 22 is approximately one-hundred microns. In comparison, the fiber core is only nine microns wide for a single mode fiber. Therefore, the non-liner dispersion and the resulting position shift causes the light beam 22 to miss the core of its corresponding fiber 16 in fiber array 16. This leads to insertion losses.

Figure 7A:
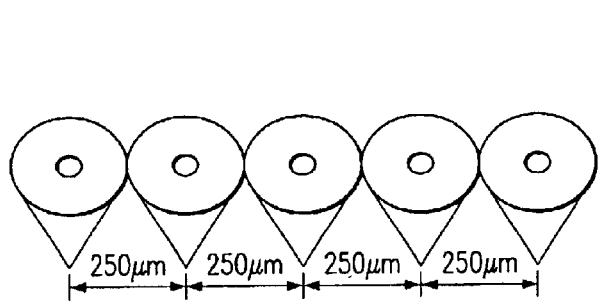
FIGS. 7A and 7B illustrate various embodiments of a fiber array associated with the optical device of FIG. 1.
Figure 7B:
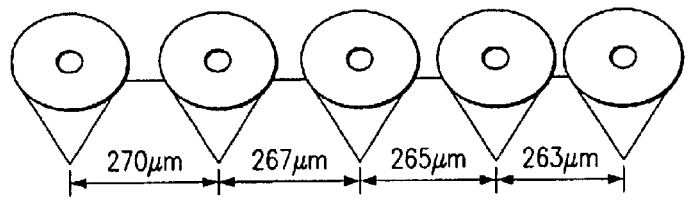

FIG. 7A illustrates a traditional, periodic fiber array 16 in which the pitch or the spacing between each individual fiber core remains constant at, for example, two-hundred fifty microns. FIG. 7B illustrates one embodiment of an irregularly spaced fiber array 16 used to match the dispersion curve and resulting position shift of light beams 22 illustrated in FIG. 5. In particular, the spacing between at least a pair of fibers 16 is determined to at least partially compensate for the non-linear dispersion induced position shift illustrated in FIGS. 5 and 6. For example, the spacing between a first fiber 16 (or lens 18) and a second fiber 16 (or lens 18) may be based at least in part upon the center frequency offsets associated with corresponding wavelength channels. In one embodiment, in addition to non-linearities introduced by diffraction grating 12, optical element 14 introduces non-linear dispersion into device 10. The irregularly spaced fiber array 16 may be arranged to compensate for the non-linearity introduced by either or both of diffraction grating 12 and optical element 14.

Although FIG. 7B illustrates only a portion of fiber array 16, it should be understood that the entire fiber array 16 may be arranged with an appropriate spacing between any number and combination of fibers 16 to compensate for non-linear dispersion. For example, the fiber 16 that receives the wavelength channel having a center frequency of 191.4 THz may be arranged with no position shift. The fiber 16 that receives the wavelength channel having a center frequency of 191.6 THz may be arranged with a position shift of twenty microns. The fiber 16 that receives the wavelength channel having a center frequency of 193.2 THz may be arranged with a position shift of one-hundred microns. The fiber 16 that receives the wavelength channel having a center frequency of 195.4 THz may be arranged with a position shift of twenty microns. For the embodiments where a corresponding lens array 18 is used in device 10, lenses 18 are arranged having the same irregular spacings as the corresponding fibers 16 of fiber array 16.

Figure 8:
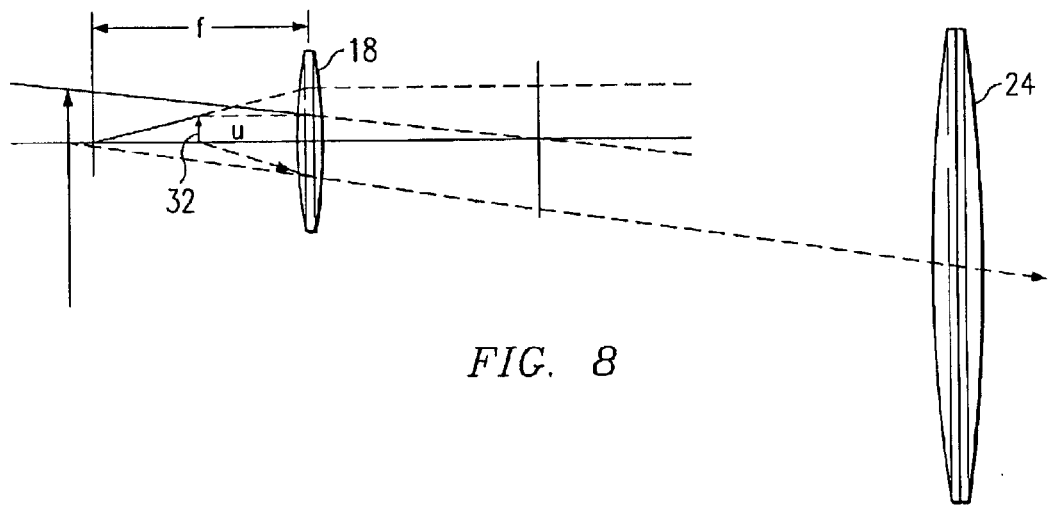
FIG. 8 illustrates the positioning of a lens with a corresponding fiber associated with the optical device of FIG. 1.

FIG. 8 illustrates the positioning of each lens 18 with respect to each corresponding fiber 16 (represented by arrow 32) in device 10. In most cases, the collectible area of light of a fiber 16 is small. For example, the fiber core diameter of a single mode fiber is normally less than ten microns. Thus, device 10 is unable to endure a several micrometer movement of the fiber 16 or the lens 24. As a consequence, the frequency bandwidth of the Mux/Demux transmission function is narrow. It is therefore desirable to improve the system stability and widen the transmission bandwidth. By using lens array 18, the tolerance of any movements or other position shifts of each light beam 22 is increased. The frequency bandwidth of the transmission function is therefore widened.

If there is no lens array 18, the transmission bandwidth is determined by the ratio between the fiber core diameter and the average fiber array pitch—the Diameter Pitch-Ratio (DPR). The larger the DPR, the wider the bandwidth is obtained. However, when the lens array 18 with a focal length of "f" is employed, the image diameter of the fiber cores as seen by other components is enlarged if the distance, "u", between the fibers 16 and the corresponding lenses 18 is less than or greater than its focal length, f. The enlarging ratio of each lens 18 is therefore established as T=f/|f−u| in geometric optics. From this equation, in order to get a wider transmission bandwidth, u should be selected in the range of 0 to f to make each fiber 16 have a large effective core diameter. The result is a larger DPR and a wider transmission bandwidth. This minimizes insertion loss. Therefore, the distance "u" may be based at least in part upon a given insertion loss threshold and/or a given transmission bandwidth threshold.

Figure 9:
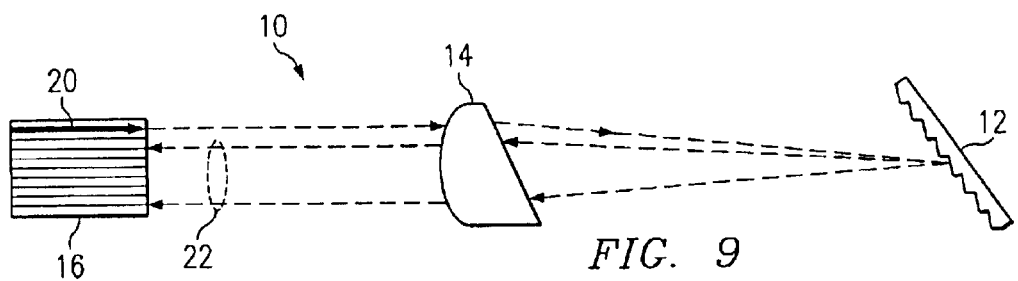
FIG. 9 illustrates another embodiment of the optical device.
Figure 10:
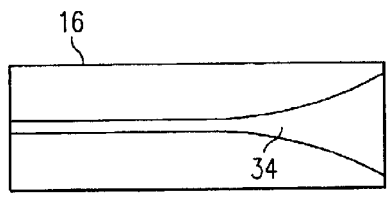
FIG. 10 illustrates a fiber having a tapered fiber core used by the optical device of FIG. 9.

FIG. 9 illustrates one embodiment of device 10 in which lens array 18 is removed. In this embodiment of device 10, fibers 16 of fiber array 16 generally have a tapered fiber core 34 as illustrated in FIG. 10. Because of the larger core diameter at the face of the fiber 16, the DPR is increased and therefore the transmission bandwidth is widened without the use of lens array 18.

Figure 11:
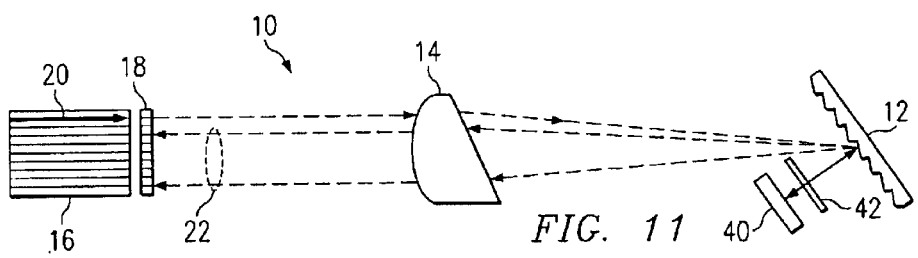
FIG. 11 illustrates yet another embodiment of the optical device.

FIG. 11 illustrates yet another embodiment of device 10 that includes a mirror or a reflector 40. In this embodiment, device 10 is arranged in a Litmann-Metcalf configuration. In this configuration, the light beams 22 strike diffraction grating 12 in a double pass yielding a higher dispersion. In one embodiment, a quarter wave plate 42 is inserted between reflector 40 and diffraction grating 12 in order to reduce polarization dispersion loss (PDL) associated with device 10. In this embodiment, after passing through the quarter wave plate 42 twice, once in the forward pass and once in the reflected pass, the polarization states, S and P, of light beams 22 are swapped and therefore the PDL is reduced.

Figure 12:
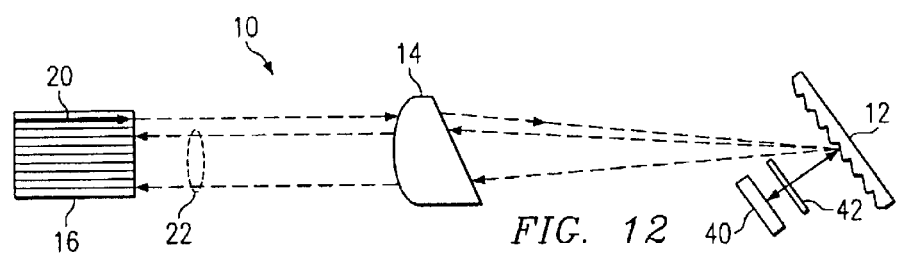
FIG. 12 illustrates still another embodiment of the optical device.

FIG. 12 illustrates yet another embodiment of device 10 that also uses a double pass propagation technique as the embodiment illustrated in FIG. 11. The difference is that fiber array 16 may include fibers 16 having a tapered fiber core 32 instead of the use of traditional fibers 16 and a lens array 18.

Figure 13:
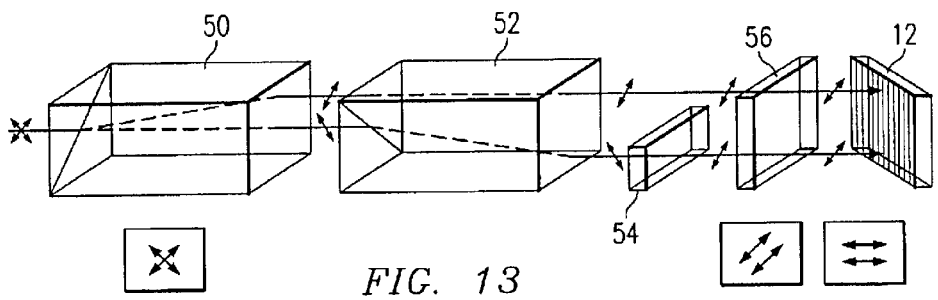
FIG. 13 illustrates another embodiment of the optical device.

FIG. 13 illustrates yet another embodiment of device 10 used to reduce the PDL. In this embodiment, a first beam displacer 50, a second beam displacer 52, a first half wave plate 54 and a second half wave plate 56 are arranged between element 14 and grating 12. The beam displacers 50 and 52 comprise birefringent elements having a forty-five degree optical axis. The propagation of signals 20 and 22 through this arrangement of beam displacers 50 and 52 and half wave plates 54 and 56 in a forward and reflected pass modifies the polarization states of the appropriate beam components, as illustrated, to reduce the PDL of device 10.

Figure 14:
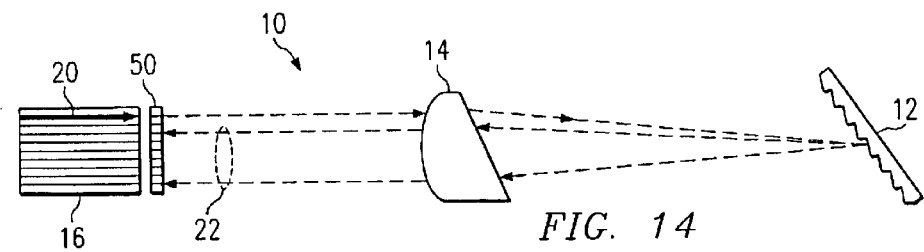
FIG. 14 illustrates an embodiment of the optical device that uses a modulator array.

FIG. 14 illustrates one embodiment of device 10 that includes a modulator array 50 that may attenuate the intensity of light beams 22 on a wavelength channel by wavelength channel basis in response to a control signal. In one embodiment, the modulator array 50 comprises a first beam splitter, a plurality of liquid crystal cells, and a second beam splitter. The first beam splitter receives a light beam 22 associated with a particular wavelength channel, and generates a first beam component having a first polarization and a second beam component having second polarization orthogonal to the first polarization. The liquid crystal cell modifies the polarization of the first beam component and the polarization of the second beam component in response to the control signal. The second beam splitter displaces at least one of the first beam component and the second beam component based at least in part upon the polarization. By manipulating the polarization of a particular light beam 22 associated with a particular wavelength channel, the intensity of the light beam 22 may be attenuated.

In another embodiment, modulator array 50 comprises a plurality of polymer dispersed liquid crystal (PDLC) cells. Each PDLC cell may attenuate the intensity of a corresponding light beam 22 in response to a control signal. In this regard, attenuation may be achieved on a wavelength channel by wavelength channel basis. Although FIG. 14 illustrates device 10 without lens array 18, it should be understood that the embodiment of device 10 using modulator array 50 may also include lens array 18 to achieve the particular advantages described above.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. An optical device for demultiplexing an optical signal, comprising:
    a grating operable to receive an optical signal comprising a plurality of wavelength channels and further operable to generate a plurality of spatially separate light beams, each light beam associated with a particular wavelength channel;
    an optical element operable to at least partially compensate a temperature based frequency shift associated with the spatially separated light beams;
    a plurality of lenses arranged such that a spacing between at least a pair of lenses is determined to at least partially compensate a non-linearity introduced by the grating; and
    a plurality of fibers, each fiber associated with a corresponding lens and operable to receive a corresponding light beam, wherein at least one fiber is placed a distance that is less than a focal length associated with its corresponding lens.

2. The optical device of claim 1, wherein:
    a first wavelength channel received by the optical element has a first center frequency offset at a first operating temperature;
    the first wavelength channel received by the optical element has a second center frequency offset at a second operating temperature; and
    the optical element processes the first wavelength channel such that the difference between the first center frequency offset and the second center frequency offset is less than a predetermined threshold at each of the first operating temperature and the second operating temperature.

3. The optical device of claim 1, wherein the optical element comprises a refractive material having a convex first surface and an angled second surface.

4. The optical device of claim 3, wherein the convex first surface is operable to decollimate at least one light beam.

5. The optical device of claim 3, wherein a bias angle associated with the angled second surface is based at least in part upon the temperature based frequency shift associated with the spatially separated light beams.

6. The optical device of claim 1, wherein the spacing among a plurality of lenses is non-periodic.

7. The optical device of claim 1, wherein:
a first wavelength channel received by a first lens has a first center frequency offset;
a second wavelength channel received by a second lens has a second center frequency offset; and
the spacing between the first lens and the second lens is based at least in part upon the first center frequency offset and the second center frequency offset.

8. The optical device of claim 1, wherein a spacing between each pair of lenses is determined to at least partially compensate a non-linearity introduced by the optical element.

9. The optical device of claim 1, wherein at least one lens comprises a gradient index lens.

10. The optical device of claim 1, wherein at least one lens comprises a convex lens.

11. The optical device of claim 1, wherein the distance between the at least one fiber and its corresponding lens is based at least in part upon an insertion loss threshold.

12. The optical device of claim 1, wherein the distance between the at least one fiber and its corresponding lens is based at least in part upon a transmission bandwidth threshold.

13. The optical device of claim 1, further comprising:
a mirror; and
a λ/4 wave plate positioned between the mirror and the grating.

14. The optical device of claim 1, further comprising a modulator array comprising a plurality of liquid crystal cells, each liquid crystal cell operable to attenuate the intensity of a corresponding subset of wavelength channels in response to a control signal.

15. The optical device of claim 14, wherein the modulator array further comprises:
a first beam splitter operable to generate a first beam component having a first polarization and a second beam component having a second polarization orthogonal to the first polarization, wherein at least one liquid crystal cell is further operable to modify at least one of the first polarization and the second polarization in response to the control signal; and
a second beam splitter operable to displace at least one of the first beam component and the second beam component based at least in part upon polarization.

16. The optical device of claim 14, wherein at least one liquid crystal cell comprises a polymer dispersed liquid crystal cell.

17. An optical device for multiplexing a plurality of wavelength channels, comprising:
a grating operable to receive a plurality of spatially separated light beams, each light beam associated with a particular wavelength channel, and further operable to generate an optical signal comprising the plurality of light beams;
an optical element operable to at least partially compensate a temperature based frequency shift associated with the spatially separated light beams;
a plurality of lenses arranged such that a spacing between at least a pair of lenses is determined to at least partially compensate a non-linearity introduced by the grating; and
a plurality of fibers, each fiber associated with a corresponding lens and operable to communicate a corresponding light beam, wherein at least one fiber is placed a distance that is less than a focal length associated with its corresponding lens.

18. The optical device of claim 17, wherein:
a first wavelength channel received by the optical element has a first center frequency offset at a first operating temperature;
the first wavelength channel received by the optical element has second center frequency offset at a second operating temperature; and
the optical element processes the first wavelength channel such that the difference between the first center frequency offset and the second center frequency offset is less than a predetermined threshold at each of the first operating temperature and the second operating temperature.

19. The optical device of claim 17, wherein the optical element comprises a refractive material having a convex first surface and an angled second surface.

20. The optical device of claim 19, wherein the convex first surface is operable to collimate at least one spatially separated light beam.

21. The optical device of claim 19, wherein a bias angle associated with the angled second surface is based at least in part upon the temperature based frequency shift associated with the spatially separated light beams.

22. The optical device of claim 17, wherein the spacing among a plurality of lenses is non-periodic.

23. The optical device of claim 17, wherein a spacing between each pair of lenses is determined to at least partially compensate a non-linearity introduced by the optical element.

24. The optical device of claim 17, wherein at least one lens comprises a gradient index lens.

25. The optical device of claim 17, wherein at least one lens comprises a convex lens.

26. The optical device of claim 17, wherein the distance between the at least one fiber and its corresponding lens is based at least in part upon an insertion loss threshold.

27. The optical device of claim 17, wherein the distance between the at least one fiber and its corresponding lens is based at least in part upon a transmission bandwidth threshold.

28. The optical device of claim 17, further comprising:
a mirror; and
a λ/4 wave plate positioned between the mirror and the grating.

29. The optical device of claim 17, further comprising a modulator array comprising a plurality of liquid crystal cells, each liquid crystal cell operable to attenuate the intensity of a corresponding subset of wavelength channels in response to a control signal.

30. The optical device of claim 29, wherein the modulator array further comprises:

a first beam splitter operable to generate a first beam component having a first polarization and a second beam component having a second polarization orthogonal to the first polarization, wherein at least one liquid crystal cell is further operable to modify at least one of the first polarization and the second polarization in response to the control signal; and a second beam splitter operable to displace at least one of the first beam component and the second beam component based at least in part upon polarization.

31. The optical device of claim 29, wherein at least one liquid crystal cell comprises a polymer dispersed liquid crystal cell.

32. An optical device for demultiplexing an optical signal, comprising:

a grating operable to receive an optical signal comprising a plurality of wavelength channels and further operable to generate a plurality of spatially separated and light beams, each light beam associated with a particular wavelength channel;

an optical element operable to at least partially compensate a temperature based frequency shift associated with the spatially separated light beams; and a plurality of fibers, each fiber operable to receive a corresponding light beam;

wherein:

a first wavelength channel received by the optical element has a first center frequency offset at a first operating temperature;

the first wavelength channel received by the optical element has a second center frequency offset at a second operating temperature; and the optical element processes the first wavelength channel such that the difference between the first center frequency offset and the second center frequency offset is less than a predetermined threshold at each of the first operating temperature and the second operating temperature.

33. The optical device of claim 32, wherein at least one fiber comprises a tapered fiber core.

34. The optical device of claim 32, wherein the plurality of fibers are arranged such that a spacing between at least a pair of fibers is determined to at least partially compensate a non-linearity introduced by the grating.

35. The optical device of claim 32, further comprising a plurality of lenses arranged between the optical element and the plurality of fibers wherein each fiber is associated with a corresponding lens and operable to receive a corresponding light beam, and wherein at least one fiber is placed a distance that is less than a focal length associated with its corresponding lens.

36. The optical device of claim 35, wherein the plurality of lenses are arranged such that a spacing between at least a pair of lenses is determined to at least partially compensate a non-linearity introduced by the grating.

37. The optical device of claim 35, wherein at least one lens comprises a gradient index lens.

38. The optical device of claim 35, wherein at least one lens comprises a convex lens.

39. The optical device of claim 35, wherein the distance between the at least one fiber and its corresponding lens is based at least in part upon an insertion loss threshold.

40. The optical device of claim 35, wherein the distance between the at least one fiber and its corresponding lens is based at least in part upon a transmission bandwidth threshold.

41. The optical device of claim 32, wherein the optical element comprises a refractive material having a convex first surface and an angled second surface.

42. The optical device of claim 41, wherein the convex first surface is operable to decollimate at least one light beam.

43. The optical device of claim 41, wherein a bias angle associated with the angled second surface is based at least in part upon the temperature based frequency shift associated with the spatially separated light beams.

44. The optical device of claim 32, wherein the spacing among a plurality of fibers is non-periodic.

45. The optical device of claim 32, wherein:

a first wavelength channel received by a first fiber has a first center frequency offset;

a second wavelength channel received by a second fiber has a second center frequency offset; and the spacing between the first fiber and the second fiber is based at least in part upon the first center frequency offset and the second center frequency offset.

46. The optical device of claim 32, wherein a spacing between at least a pair of fibers is determined to at least partially compensate non-linearity introduced by the optical element.

47. The optical device of claim 32, further comprising:

a mirror; and a $\lambda/4$ wave plate positioned between the mirror and the grating.

48. The optical device of claim 32, further comprising a modulator array comprising a plurality of liquid crystal cells, each liquid crystal cell operable to attenuate the intensity of a corresponding subset of wavelength channels in response to a control signal.

49. The optical device of claim 48, wherein the modulator array further comprises:

a first beam splitter operable to generate a first beam component having a first polarization and a second beam component having a second polarization orthogonal to the first polarization, wherein at least one liquid crystal cell is further operable to modify at least one of the first polarization and the second polarization in response to the control signal; and a second beam splitter operable to displace at least one of the first beam component and the second beam component based at least in part upon polarization.

50. The optical device of claim 48, wherein at least one liquid crystal cell comprises a polymer dispersed liquid crystal cell.

51. An optical device for demultiplexing an optical signal, comprising:

a grating operable to receive an optical signal comprising a plurality of wavelength channels and further operable to generate a plurality of spatially separate light beams, each light beam associated with a particular wavelength channel;

an optical element operable to at least partially compensate a temperature based frequency shift associated with the spatially separated light beams;

a plurality of fibers, each fiber operable to receive a corresponding light beam; and a plurality of lenses arranged between the optical element and the plurality of fibers, wherein each fiber is associated with a corresponding lens and operable to receive a corresponding light beam, and wherein at least one fiber is placed a distance that is less than a focal length associated with its corresponding lens.

52. The optical device of claim 51, wherein the distance between the at least one fiber and its corresponding lens is based at least in part upon insertion loss threshold.

53. The optical device of claim 51, wherein the distance between the at least one fiber and its corresponding lens is based at least in part upon a transmission bandwidth threshold.

54. An optical device for demultiplexing an optical signal comprising:
 a grating operable to receive an optical signal comprising a plurality of wavelength channels and further operable to generate a plurality of spatially separate light beams, each light beam associated with a particular wavelength channel;
 an optical element operable to at least partially compensate a temperature based frequency shift associated with the spatially separated light beams; and
 a plurality of fibers, each fiber operable to receive a corresponding light beam;
 wherein the distance between at least one fiber and a corresponding lens arranged between the optical element and the plurality of fibers is based at least in part upon a transmission bandwidth threshold.

55. An optical device for demultiplexing an optical signal, comprising:
 a grating operable to receive an optical signal comprising a plurality of wavelength channels and further operable to generate a plurality of spatially separate and light beams, each light beam associated with a particular wavelength channel;
 an optical element operable to at least partially compensate a temperature based frequency shift associated with the spatially separated light beams;
 a plurality of fibers, each fiber operable to receive a corresponding light beam;
 a mirror; and
 a $\lambda/4$ wave plate positioned between the mirror and the grating.

56. An optical device for demultiplexing an optical signal comprising:
 a grating operable to receive an optical signal comprising a plurality of wavelength channels and further operable to generate a plurality of spatially separate light beams, each light beam associated with a particular wavelength channel;
 an optical element operable to at least partially compensate a temperature based frequency shift associated with the spatially separated light beams;
 a plurality of fibers, each fiber operable to receive a corresponding light beam; and
 a modulator array comprising a plurality of liquid crystal cells, each liquid crystal cell operable to attenuate the intensity of a corresponding subset of wavelength has channels in response to a control signal.

57. The optical device of claim 56, wherein the modulator array further comprises:
 a first beam splitter operable to generate a first beam component having a first polarization and a second beam component having a second polarization orthogonal to the first polarization, wherein at least one liquid crystal cell is further operable to modify at least one of the first polarization and the second polarization in response to the control signal; and
 a second beam splitter operable to displace at least one of the first beam component and the second beam component based at least in part upon polarization.

58. The optical device of claim 56, wherein at least one liquid crystal cell comprises a polymer dispersed liquid crystal cell.

59. An optical device for demultiplexing an optical signal comprising:
 a grating operable to receive an optical signal comprising a plurality of wavelength channels and further operable to generate a plurality of spatially separate light beams, each light beam associated with a particular wavelength channel;
 an optical element operable to at least partially compensate a temperature based frequency shift associated with the spatially separated light beams, wherein the optical element comprises a refractive material having a convex first surface and angled second surface; and
 a plurality of fibers, each fiber operable to receive a corresponding light beam;
 wherein a bias angle associated with the angled second surface is based at least in part upon the temperature based frequency shift associated with the spatially separated light beams.

60. An optical device for demultiplexing an optical signal, comprising:
 a grating operable to receive an optical signal comprising a plurality of wavelength channels and further operable to generate a plurality of spatially separate and light beams, each light beam associated with a particular wavelength channel;
 an optical element operable to at least partially compensate a temperature based frequency shift associated with the spatially separated light beams; and
 a plurality of fibers, each fiber operable to receive a corresponding light beam;
 wherein the plurality of fibers are arranged such that a spacing between at least a pair of fibers is determined to at least partially compensate a non-linearity introduced by the grating.

61. An optical device for demultiplexing an optical signal, comprising:
 a grating operable to receive an optical signal comprising a plural of wavelength channels and further operable to generate a plurality of spatially separated light beams, each light beam associated with a particular wavelength channel;
 an optical element operable to at least partially compensate a temperature based frequency shift associated with the spatially separated light beams; and
 a plurality of fibers, each fiber operable to receive a corresponding light beam;
 wherein a spacing between at least a pair of fibers is determined to at least partially compensate a non-linearity introduced by the optical element.

* * * * *